April 26, 1938.  J. A. SWEENEY  2,115,348
NOSE PAD MOUNTING
Filed Sept. 13, 1935
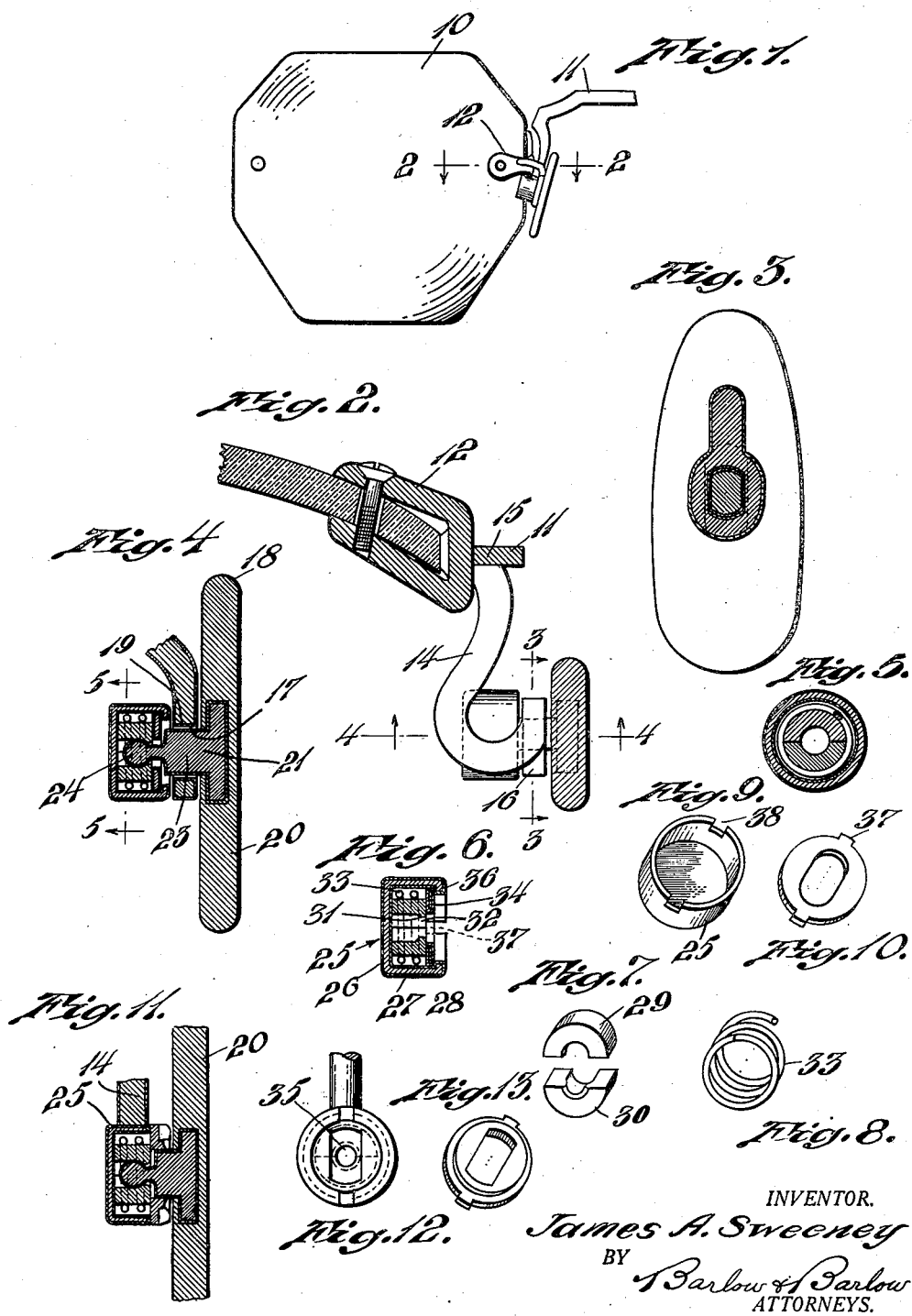
INVENTOR.
James A. Sweeney
BY Barlow & Barlow
ATTORNEYS.

Patented Apr. 26, 1938

2,115,348

UNITED STATES PATENT OFFICE 2,115,348

NOSE PAD MOUNTING

James A. Sweeney, Providence, R. I., assignor to Universal Optical Corporation, a corporation of Rhode Island Application September 13, 1935, Serial No. 40,419

9 Claims. (Cl. 88—49)

This invention relates to an ophthalmic mounting, and more particularly to the mounting for a nose pad; and has for one of its objects the provision of a nose pad which may be easily and quickly detached and replaced in its desired position adjacent the nasal edge of the lens.

Another object of the invention is the provision of a nose pad mounting which may be snapped into position, or snapped from position and replaced by a fresh one if desired.

Another object of the invention is the provision of a mounting such that the exposed parts may have a corrosive resisting plating over them on all of the exposed surfaces and yet may be readily detachable for replacement, should occasion so require.

Another object of the invention is the provision of a mounting for a nose pad which is of such a construction that a rolled gold plate may be provided on the exposed surfaces of the parts which go to make up the mounting for the pad.

Another object of the invention is the provision of a detachable nose pad mounting which will permit of some rocking movement of the pad in the desired direction, and yet will retain the pad fully in its mounted position, as is desired.

With these and other objects in view, the invention consists of certain novel features of construction, as will be more fully described, and particularly pointed out in the appended claims.

In the accompanying drawing:

Fig. 1 is a rear view of one lens and a portion of the bridge connected thereto, showing the nose pad as mounted in position adjacent the nasal edge of the lens;

Fig. 2 is a section on line 2—2 of Figure 1;

Fig. 3 is a section on line 3—3 of Figure 2;

Fig. 4 is a section on line 4—4 of Figure 2;

Fig. 5 is a section on line 5—5 of Figure 4;

Fig. 6 is a central sectional view through the resilient socket member of my construction;

Fig. 7 is a perspective view of the gripping jaws of the socket member;

Fig. 8 is a perspective view of the spring for urging the jaws into gripping position;

Fig. 9 is a perspective view of the shell of the socket member;

Fig. 10 is a perspective view of the closure plate for the socket member;

Fig. 11 is a sectional view similar to Figure 4, showing a modified construction of the arrangement of the socket member and a modified construction of the stud of the nose pad;

Fig. 12 is an end view of the socket such as shown in Figure 11;

Fig. 13 is a perspective view of the modified closure plate of Figure 11.

In the use of ophthalmic mountings, it frequently occurs, particularly in cases where nose pads rock somewhat, that corrosion takes place about the connection of the pad or the opening through which the pad stud is mounted so as to cause undue looseness of the pad and make necessary the removal of the worn pad and replacement by a fresh one; in order that the pad will not rotate about the stud axis; and in order to prevent this cause and at the same time provide a readily detachable pad, I have made a construction which may have a corrosive resisting plating on its surface and also a construction which may be readily detached by reason of a snap fastener action, there being provided a stud and a socket part which may be resiliently held together, and which together with the protecting plating provides a device which is very durable and yet one which is designed to be changed because of wear or for any other reason; and the following is a more detailed description of the present embodiment of this invention, illustrating the preferred means by which these advantageous results may be accomplished:

With reference to the drawing, 10 designates the lens and 11 a bridge which has a shoe 12 mounted thereon for securing it to the lens. A nose pad arm 14 extends rearwardly from the bridge 11 to which it is soldered as at 15 at the juncture of the bridge and a strap 12, and this arm is provided with an enlargement 16 at its free end with an opening 17 therein.

The arm 14 is of rolled plate stock, usually provided with a coating of gold 18 upon its surface. The hole 17 through the enlarged end 16 is punched in such a manner as to draw the gold plate as at 19 into this opening. The nose pad 20 is usually formed of some non-metallic material, such as zylonite or the like, and a stud member 21 also of some roll gold plate material is set into and fixed in the zylonite and provided with a shank 23 which extends through the opening 17 and has a ball end 24 for the reception of a snap fastener socket member 25, see Figure 6, which may be snapped on to the end of the ball 24 to hold the nose pad in mounted position on the nose pad arm 14.

The socket member 25 consists of a cup 26 drawn up of rolled gold plate with the plate designated 27 on the outside and 28 on the inside. Within this cup there is provided a pair of jaws 29 and 30 which are provided with a spherical seat 31 and a tapered entrance opening 32 on the other side of the narrow neck portion. These jaws are forced toward each other by a helical spring 33 which, when the ball end engages the tapered portion 32, permits the jaws to spread apart against the action of the spring to receive the insertion of the ball end 24 thereinto.

A plate 34 having a rectangular opening 35 is provided with a pair of lugs 37 to bottom in the notches 38 in the side walls of the cup 25 and is held in position by the rolled over edge 36 of the cup to retain the plate in position and yet permit freedom of action of the jaws 29 and 30 toward and from each other.

By this arrangement it is merely necessary to pull off the socket 25, as shown in Figure 6, from the ball end 24 when the pad may be readily removed by extracting the stud 21 from the opening 17 in the end of the pad arm 14.

In some cases, as shown in Figures 11 and 12, it is desirable to mount the socket 25 at the end of the arm 14 by soldering the same thereto, in which case it is merely necessary that the enlargement at the end of the arm 14 and the opening 17 are unnecessary and a pad may be snapped inwardly into position and removed from the end of the pad arm 14, as desired.

The shank portion 23 of the stud is generally of the same shape as the rectangular portion 35 in the plate by means of which the movement of the pad may be governed in Figures 11 and 12; that is, if a rocking motion about the ball end 24 as a center is desired, the long dimension of the opening 35 will be placed in a direction in which the rocking motion is desired, and the long dimension of this opening will be somewhat greater than the corresponding dimension of the stud. This rocking movement is desired to be restricted in a right angular direction of the narrower dimension of the rectangular opening 35 which will therefore snugly fit along the sides of the stud 23 to prevent rocking in this direction.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In an ophthalmic mounting, a bridge, a pair of nose pads, socket members carried by the ends of said bridge, each having separable gripping jaws with a spherical socket, resilient means moving said jaws toward each other, and a stud on each pad having a spherical end detachably engageable with one of said sockets.

2. In an ophthalmic mounting, a bridge, a nose pad, a socket member carried by said bridge at one end thereof including gripping jaws with curved surfaces, resilient means for moving said jaws toward each other, and a stud on said pad with curved surfaces detachably engaging said socket, for rocking movement with reference thereto.

3. In an ophthalmic mounting, a bridge, a nose pad, a socket member carried by said bridge at one end thereof including gripping jaws with a spherical socket, resilient means for moving said jaws toward each other, and a stud on said pad having a spherical end detachably engaging said socket.

4. In an ophthalmic mounting, a bridge, a nose pad, a socket member carried by said bridge at one end thereof, including gripping jaws with a spherical socket, resilient means for moving said jaws toward each other, a plate with an out of round opening therein, and a stud on said pad with a similar out of round shank and having a spherical end detachably engaging said socket.

5. In an ophthalmic mounting, a bridge, a pair of nose pads, means for securing said pads at the ends of said bridge including cups having relatively movable jaws therein forming a socket, a spring within each of said cups for forcing the jaws together, and a plate fixed at one end of each cup and holding the jaws and spring therein.

6. In an ophthalmic mounting, a nose pad arm, a nose pad, means for securing said pad on said arm comprising a socket member including gripping jaws formed with curved engaging surfaces, resilient means for moving said jaws toward each other, and a stud carried by one of said parts and having a correspondingly curved end detachably engaging said socket.

7. In an ophthalmic mounting, a nose pad arm having an opening therein, a nose pad having a stud carried by said pad extending through said opening and provided with a curved head end and narrow neck, a socket member including gripping jaws formed with curved engaging surfaces, and resilient means for moving said jaws toward each other to detachably engage said curved head end of said stud.

8. In an ophthalmic mounting, an arm, a nose pad, means for securing said pad at the end of said arms including a cup having relatively movable jaws therein forming a socket, a spring within said cup for forcing said jaws together, and a plate fixed at one end of said cup and holding the jaws and spring therein.

9. In an ophthalmic mounting, an arm having a hole therein, a nose pad, means for securing said pad to the end of said arm including a cup having relatively movable jaws therein forming a socket, a spring within said cup for forcing the jaws together, a plate at one end of said cup and holding the jaws and spring therein, and a stud on said pad extending through said hole in the arm and engaging said socket.

JAMES A. SWEENEY.